United States Patent [19]

Faillace

[11] Patent Number: 5,149,193
[45] Date of Patent: Sep. 22, 1992

[54] EXTRUDER TEMPERATURE CONTROLLER AND METHOD FOR CONTROLLING EXTRUDER TEMPERATURE

[75] Inventor: Louie M. Faillace, Pawcatuck, Conn.
[73] Assignee: Crompton & Knowles Corporation, Stamford, Conn.
[21] Appl. No.: 641,310
[22] Filed: Jan. 15, 1991
[51] Int. Cl.[5] .......................... B29C 7/72; B29C 47/82
[52] U.S. Cl. .................................... 366/145; 264/40.6; 264/40.7; 264/349; 425/143; 425/145; 425/162; 425/170; 425/379.1; 366/149; 364/502
[58] Field of Search ..................... 264/40.1, 40.6, 40.7, 264/349; 425/135, 143, 144, 145, 162, 170, 157, 379.1; 366/145, 149; 364/502

[56] References Cited

U.S. PATENT DOCUMENTS

| | | |
|---|---|---|
| Re. 31,903 | 6/1985 | Faillace . |
| 2,508,988 | 5/1950 | Bradley . |
| 3,698,844 | 10/1972 | Grimm . |
| 3,728,058 | 4/1973 | Wheeler . |
| 3,733,059 | 5/1973 | Pettit . |
| 3,751,014 | 8/1973 | Waterloo . |
| 3,822,867 | 7/1974 | Evans . |
| 3,826,305 | 7/1974 | Fishman . |
| 3,866,669 | 2/1975 | Gardiner . |
| 3,870,445 | 3/1975 | Hold et al. ............ 425/145 |
| 4,071,745 | 1/1978 | Hall . |
| 4,072,185 | 2/1978 | Nelson . |
| 4,097,723 | 6/1978 | Leitner . |
| 4,197,070 | 4/1980 | Koschmann . |
| 4,272,466 | 6/1981 | Harris . |
| 4,721,589 | 1/1988 | Harris ................. 425/143 |
| 4,867,664 | 9/1989 | Fukuhara ............. 425/145 |

FOREIGN PATENT DOCUMENTS

| | | | |
|---|---|---|---|
| 53-65361 | 6/1978 | Japan ................. 425/144 |
| 1056593 | 1/1967 | United Kingdom . |

OTHER PUBLICATIONS

Turnbull, Cascade Control of Melt Temperature for Extruding and Injection Moulding Machines, J of IFAC presented at IFAC/PRP Brussels, May 1971.
"System 200 Operating Manual" Crompton and Knowles, Dec. 3, 1976.
"Anticipatory Temperature Control of Extruders" Stewart E. Walton, Davis-Standard Div., Crompton and Knowles, Delivered at 47th Annual Convention of the Wire Association International, Inc., Oct. 16-20, 1977, Boston, Mass.
H. E. Harris, "Depth of Sensors in Extruder Barrels," Society of Plastics Engineers, 35th Annual Technical Conf. Montreal, Canada, Apr, 25-28, 1977.
Don Morgan, "Temperature Control on Machinery for Extrusion of Plastics and Rubber," Eurotherm, 1971, pp. 29-36.
Richard K. West, "Advantages of Dual Thermocouples in Injection Cylinders and Extrusion Barrels," Society of Plastics Engineers Journal, vol. 13, No. 4, Apr. 1957.
Fenwal Incorporated, "How to Get Better Temperature Control," 1961, Revised, 1975.
R. F. Bayless, "Three-mode Pretuning of Temperature Controllers," Plastics Engineering, Mar. 1978 pp. 59-62.
"Modicon 184/384 Controller User's Manual," Aug. 1976.
West Instrument Limited "Double Thermocouple System for Plastic Machinery"-undated.

*Primary Examiner*—Jeffery Thurlow
*Assistant Examiner*—Mathieu Vargot
*Attorney, Agent, or Firm*—Bernard Francis Crowe

[57] ABSTRACT

An extruder temperature controller for an extruder barrel and a method for controlling the temperature of an extruder barrel, includes a device for determining an actual screw speed and for storing a plurality of screw speeds. Each member of the plurality of stored screw speeds has a corresponding stored temperature reset value. The extruder temperature controller has a device for comparing and selecting that compares the actual screw speed to each of the plurality of stored screw speeds and selects a default screw speed. The default screw speed has a smaller deviation from the actual screw speed than any other member of the compared, stored screw speeds. The controller further includes a device for generating a control output driver signal to a heat exchanger. The control output driver signal is the corresponding stored temperature reset value for the default screw speed. The adaptive reset value for a specific speed is derived for each extruder barrel zone for each profile table section of setpoints and parameters for a particular extrusion material and particular process.

17 Claims, 3 Drawing Sheets

EXTRUDER TEMPERATURE CONTROLLER AND METHOD FOR CONTROLLING EXTRUDER TEMPERATURE

BACKGROUND OF THE INVENTION

1. Field of the Invention

The invention relates to an extruder temperature controller and a method for controlling the temperature of an extruder barrel zone of an extrusion device. Specifically, the invention relates to an extruder temperature controller and a method for controlling the temperature of an extruder barrel zone wherein the control of the temperature is responsive to a change in the speed of an extruder screw.

2. Description of the Background Art

Extrusion devices are often used in the plastics or other industries to continuously melt, blend, form, and solidify plastics or other extrusion materials into a desired shape. Typical extrusion devices include a rotating screw housed coaxially within a heated, cylindrically-shaped barrel. The screw rotates within the barrel and drives an extrusion material such as plastic through the barrel. The extrusion material is forced through a die or aperture at the end of the barrel. A temperature drop, that occurs when the extrusion material leaves the heated barrel, allows the extrusion material to solidify in a molded shape that is determined by the profile of the die.

The temperature of the extruder barrel zone or "heat exchange zone" is one variable that can be controlled during an extrusion process. The control of the barrel temperature, therefore, eliminates a variable while extruding material such as plastic. The extruder barrel can be operated to control the temperature of the extrusion material within the barrel under one or more of three conditions. An extruder barrel can (1) increase the temperature of an extrusion material, (2) decreases the temperature of an extrusion material, or (3) maintain the temperature of an extrusion material. The third condition of maintaining a temperature of an extrusion material occurs when an extruder is operated at a speed wherein the heat gain from the friction of the extrusion material coming, as the extrusion material is processed in the extruder barrel, is approximately equal to the heat loss from the extruder barrel. This condition of no heat gain or loss in known as an "adiabatic" condition.

Most extrusion devices have a plurality of heat exchange zones. The temperature of each heat exchange zone can be independently controlled. This independent control is such that one or more heat exchange zones heat the material, that is being processed, while the remaining heat exchange zones are in an adiabatic condition or are cooling the extrusion material. It is common for a heat exchange zone near the die end of an extruder barrel to be used to maintain the temperature of an extrusion material which would otherwise be increased as the extrusion material passed through the barrel just before the extrusion material is extruded through the die. This procedure indirectly cools the extrusion material. An extruder barrel, typically, has five to eight heat exchange zones, but the number of heat exchange zones can vary and often depends upon the size of the extruder.

An extruder temperature controller can control the temperature of its extruder barrel with heat exchange elements. The extruder barrel is, commonly, surrounded by a shell containing heat exchange elements. The heat exchange elements can be (1) heaters such as resistive heaters which increase the extruder barrel temperature and (2) cooling tubes for circulating water or another coolant in order to remove heat and maintain the temperature at a desired setpoint for the extruder barrel temperature. Alternative heat exchange elements can be used. For example, the cooling structure can be a finned shell with a blower that circulates air past the fins.

Temperature sensors, such as thermocouples, are positioned in extruder barrels to signal the temperature at the location of the sensor. Two thermocouples per extruder barrel zone can be provided and are electrically isolated from one another. A first thermocouple is known as the "A thermocouple" of the pair and is placed juxtaposed to the inner surface of the extruder barrel. The end of the "A" thermocouple is usually in contact with an inner liner of the extruder barrel. A second thermocouple is known as the "B thermocouple" of the pair and is placed in the interior of the heater/cooler shell. Each heat exchange zone of the extruder is similarly provided with a pair of thermocouples, "A" and "B", similarly placed. An air-cooled extruder system also has the B thermocouple in the interior of the shell.

An extruder temperature controller receives signals from the temperature sensors. The extruder temperature controller determines whether the temperature of a given heat exchange zone is too cool or too hot and, if necessary, signals the appropriate heat exchange elements to increase or decrease the temperature in the particular heat exchange zone regulated by that controller.

The extruder barrel and the heat exchange elements store residual heat. Due to the mass and thermal conductivity of the composition and the extruder barrel, a delay in the transfer of heat occurs resulting in a lag between the actual temperature and the signalling of instructions for that temperature by the extruder temperature controller to increase or decrease the temperature of a heat exchange zone. For example, when the extruder temperature controller instructs a heating element to cease applying heat, energy stored in the heating element continues to warm that heat exchange zone of the extruder barrel. This continued warming causes the extruder barrel temperature to continue to rise in that heat exchange zone. The lag between the issuance of an instruction from the extruder temperature controller and the response from the heat exchange elements causes the extruder barrel temperature to oscillate about the desired temperature.

U.S. Pat. No. 3,866,669 to Gardiner and U.S. Pat. No. 3,751,014 to Waterloo both address the problem of oscillating extruder barrel temperatures. In the systems described in Gardiner and Waterloo, a first temperature probe or thermocouple provides a "deep" temperature measurement representative of the temperature of the extrusion material. A second thermocouple is positioned within the shell surrounding the extruder barrel to provide a "shallow" temperature measurement representative of the temperature of the heat exchange elements. The electrical signals from the pair of thermocouples are combined to provide an average value. The extruder temperature controller monitors the weighted average value and selectively activates the heating and cooling elements to maintain the average value at a temperature that is approximately equal to a setpoint representative of the desired temperature for the extruder barrel zone.

The control of the heat exchange elements by an extruder temperature controller that is responsive to an average value for zone, that is being processed, reduces temperature and/or control signal oscillations. An example of such a temperature oscillation occurs during operational conditions wherein a resistive heating element applies heat to increase the temperature of an extruder barrel. While the heating element is active, the shallow temperature measurement is higher than the deep temperature measurement. This temperature difference occurs because the shallow temperature probe is positioned in the vicinity of the activated heating element. Accordingly, the average value of the extruder temperature controller is also greater than the deep measurement or the actual temperature of the extruder barrel zone. The average value reaches the temperature setpoint while the actual temperature of the extruder barrel zone is still below the desired temperature. The extruder temperature controller inactivates the heating element after the average value reaches the temperature setpoint, but before the extruder barrel zone reaches the desired temperature. The heat stored in the heating element continues to raise the temperature of the extruder barrel zone toward the desired temperature. Such temperature oscillations can also occur during operational conditions wherein the temperature of the extruder barrel zone is being decreased.

Inactivating the heat exchange elements before the extruder barrel zone has reached the desired temperature prevents the temperature of the extruder barrel zone from "overshooting" the desired temperature which can cause undesirable temperature oscillations. This advantage is achieved at the expense of a reduction in the accuracy with which the temperature of the extruder barrel zone is controlled. More specifically, since the extruder temperature controller operates to correct the temperature only when the average temperature value deviates from the desired temperature, the extruder temperature controller may not attempt to adjust the temperature, even when the temperature of the extruder barrel zone remains below a desired elevated temperature or above a desired cooling temperature.

U.S. Pat. No. 31,903 to Faillace describes an extruder temperature controller which anticipates changes of temperature in an extruder barrel. This system monitors a control sum error to determine when the temperature has not changed significantly for a specified length of time or when the system has "stabilized". Once the system has stabilized, this extruder temperature controller examines the actual temperature of the extruder barrel zone as indicated by the deep measurement and compares the actual temperature to the desired temperature. If the actual temperature is significantly different from the desired temperature, this extruder temperature controller calculates and changes the temperature setpoint so that the control sum error appears to require a temperature adjustment. If the actual extruder barrel zone temperature is, for example, too low, the Faillace extruder temperature controller raises the setpoint above the desired temperature. The control sum error is then below the setpoint, which causes the extruder temperature controller to adjust the temperature until the control sum error is minimized.

Changes in the rotational speed of the extruder screw or "screw speed" are normal during the start-up and the shutdown of an extrusion line. However, screw speed changes typically cause a thermal load variation which is troublesome in an extrusion process. An example of this condition occurs in blow molding processes wherein the molded piece becomes jammed when exiting the mold. Sensors, which detect the jammed piece, rapidly shutdown the extruder system in order to prevent further jams and potential damage to the mold system. The extruder system during normal operation in a blow molding process runs at a preset speed.

The extruder temperature controller of the Faillace Reissue Patent in a blow molding process resolves a reset value for each heat exchange zone. The reset value is proportional to the temperature offset for that heat exchange zone, which is proportional to the thermal load for that heat exchange zone. The Faillace extruder temperature controller resolves a reset value for each heat exchange zone, individually. The criteria for a heat exchange zone to reset is as follows:

(1) the reset is enabled;
(2) the heat exchange zone is in stable control and no control alarms occur for a period of time such as a control stability time;
(3) the offset is greater than the actual alarm band which, typically, means that one offset is greater than 3° F. (1.6° C.);
(4) the reset has not occurred within the reset stability time; and
(5) the reset limit is not reached.

When an extruder system for a blow molding process is stopped due to a jam, it is typically restarted within a few minutes. The minimum time a heat exchange zone must be stable in control or "minimum reset stability time" is approximately 4 minutes. The actual time during which a heat exchange zone recovers from a step change in load, such as a sudden stop condition, is approximately 10 to 12 minutes. Therefore, the reset means in the Faillace extruder temperature controller cannot respond quickly enough to compensate for a step change in load which lasts for less than 10 to 12 minutes. The result of this condition is that a heat exchange zone is offset in temperature equal to the difference in thermal load at the normal running screw speed compared to the screw speed at stop. In addition, if the extruder system remains stopped for a period of time which allows the reset to actuate, such as when a jammed piece is cleared and the extruder system returns to a normal operating screw speed, the incorrect heat exchange zone temperature reset value causes a temperature offset. This temperature offset remains until a reset value can be resolved at the normal screw speed and compensates for the thermal load at that screw speed. This condition in a blow molding process causes a significant change in the characteristics of the plastic melt output of the extruder system. These changes cause a variation in the weight of the blow molded products. This variation can degrade the quality of the end product by causing variations in the wall thickness of the product. These variations in quality cause waste, inefficiency, and undue expense.

The Faillace extruder temperature controller does not eliminate temperature control problems in other process applications which are similar to the blow molding process. Such process applications include wire and cable coating processes. The splicing of a bare conductor or the changing of reels, while the extruder is running, during these processes produces the same temperature offset problem described above. The wire and cable processes, during a cable splice or reel change, require the extruder system and the entire production line to be slowed from a normal run speed to a speed which facilitates the splice or reel change. This slowing of the extruder screw speed causes a significant thermal load difference between normal running speed and the reduced running speed of the extruder system. The end result of this situation can be a significant change in the characteristic of the plastic melt output from the extruder system that is being applied as coating to the wire or cable. This change potentially degrades the quality of the end product.

The industry is lacking an extruder temperature controller for an extruder system that preempts a temperature reset value for each heat exchange zone upon a change in the screw speed of the extruder system.

SUMMARY OF THE INVENTION

The invention is an extruder temperature controller for an extruder system. The invention includes means for sensing an actual screw speed of an extruder screw in an extruder barrel. The extruder barrel has at least one heat exchange means. The extruder temperature controller has means for indexing and storing a plurality of screw speeds. Each member of the plurality of stored screw speeds has a corresponding temperature reset value. The extruder temperature controller has a means for comparing and selecting. The means for comparing and selecting compares the actual screw speed with each of the stored screw speeds and selects one of the stored screw speeds. The selected screw speed is a member of the plurality of stored screw speeds having a value most arithmetically equivalent to the actual screw speed. The means for comparing and selecting retrieves the temperature reset value corresponding to the selected, stored screw speed. The invention further includes a means for generating a control output driver signal to a heat exchange means. The control output driver signal is responsive to the retrieved temperature reset value from the means for comparing and selecting.

The invention includes a method for controlling the temperature of an extruder barrel. The method includes sensing an actual screw speed for an extruder screw in an extruder barrel. The extruder barrel has at least one heat exchange means. The method then involves indexing and storing a plurality of screw speeds. Each of the stored screw speeds corresponds to a temperature reset value. Comparing the actual screw speed with each of the stored screw speeds is performed. Selecting one of the stored screw speeds then occurs. The selected screw speed is a member of the plurality of stored screw speeds having a value most arithmetically equivalent to the actual screw speed. The step of selecting retrieves the temperature reset value corresponding to the selected, stored screw speed. Generating a control output driver signal to the heat exchange means occurs. The control output driver signal is responsive to the retrieved temperature reset value.

DESCRIPTION OF THE PREFERRED EMBODIMENT

Figure 1:
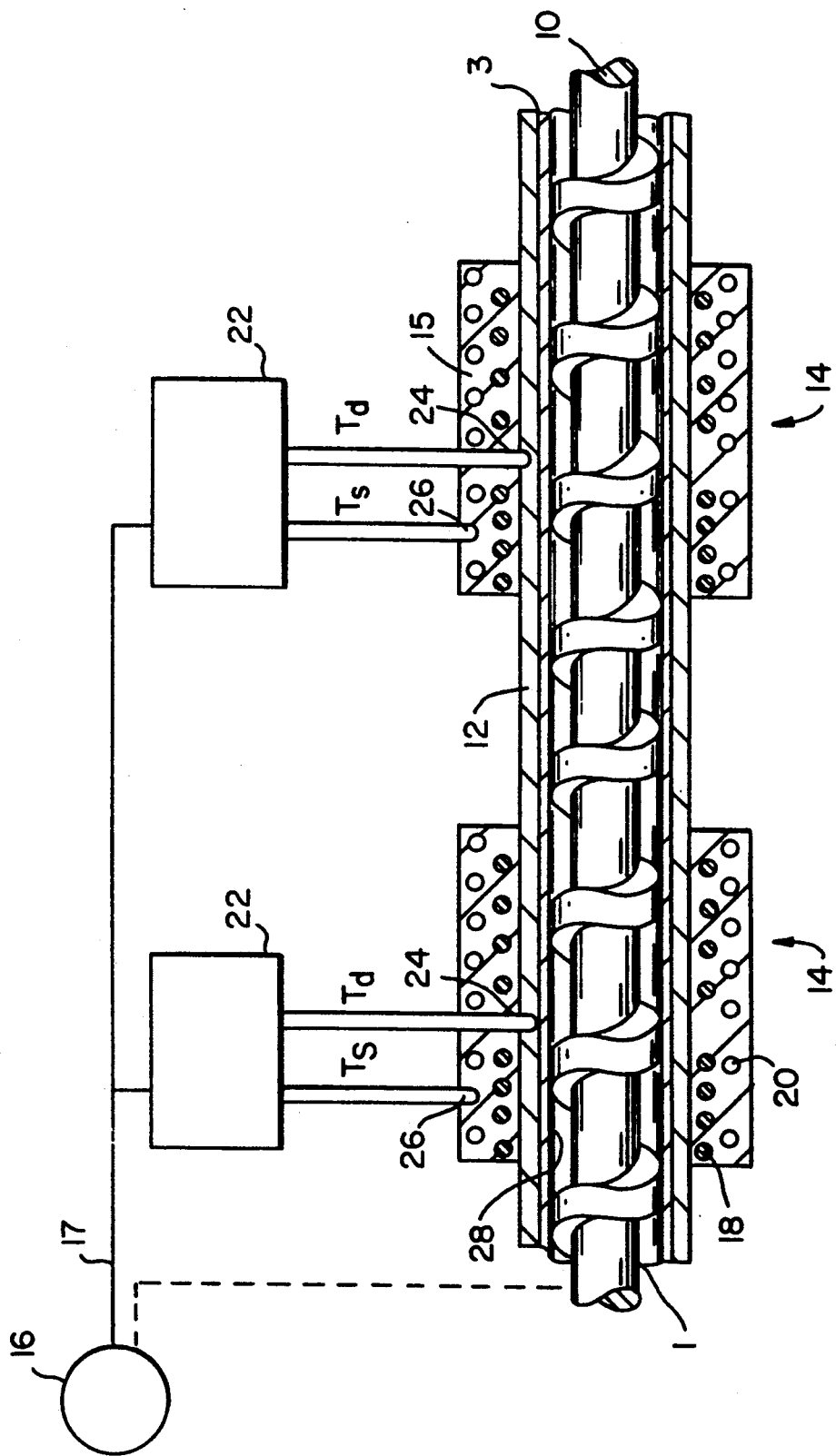
FIG. 1 is a cross sectional side view of an extruder barrel including an extruder temperature controller of the invention.

The invention includes an extruder temperature controller for a heat exchange means that is used to control the temperature of at least one extruder barrel zone. The invention includes means for sensing or determining an actual screw speed. The extruder temperature controller has means for indexing and storing a plurality of screw speeds. Each screw speed corresponds to a single member of a plurality of stored temperature reset values. The invention includes a means for comparing and selecting from the plurality of stored screw speeds. The means for comparing and selecting compares the actual screw speed to each of the plurality of stored screw speeds and selects a default screw speed from the plurality of stored screw speeds. The default screw speed has a smaller deviation from the actual screw speed than any other member of the compared, stored screw speeds. The invention further includes a means for generating a control output driver signal to a heat exchange means. The control output driver signal is derived from the corresponding stored temperature reset value for the default screw speed.

The term "reset value" for purposes of this invention corresponds to screw speed and not barrel temperature. A reset value is determined for a stable screw speed and is stored in the extruder temperature controller in association with a temperature setpoint. There is no manual input of a reset value with the desirable embodiments of this invention. Reset values are either zero or a resolved value. Typically, a reset value is resolved for each extruder barrel zone according to the thermodynamic load on an extruder system during a normal operating phase.

The invention includes means for determining actual screw speed. The means for determining actual screw speed can be an electronic or an electro-mechanical means for sensing the revolutions per unit of time of the extruder screw. Suitable means for determining actual screw speed include commercially available digital encoders or tachometers that are adapted to provide an actual screw speed input signal for the extruder temperature controller.

The extruder temperature controller has a means for storing a plurality of screw speeds. This means for storing must store screw speeds wherein each stored screw speed corresponds to a specific or actual temperature reset value for each extruder barrel zone for each screw speed. The independent screw speeds with their corresponding actual temperature reset value are entered by a reset value signal input means for inputting a temperature reset value input signal that is representative of a desired, actual temperature reset value per extruder barrel zone for each stored screw speed. The means for storing is, desirably, an electronic storage means. Suitable storage means are known in the art and can be adapted for use with this invention by those skilled in the art of this invention.

The extruder temperature controller includes means for comparing and selecting from the plurality of stored screw speeds. The means for comparing and selecting compares the actual screw speed to each member of the plurality of stored screw speeds. The means for comparing and selecting selects the stored screw speed that is most nearly equivalent to the actual screw speed. If the difference between an actual temperature for a heat exchange zone and actual temperature reset value for the selected stored screw speed is significant, the extruder temperature controller defaults to or selects the selected, stored screw speed. The actual temperature reset value that corresponds to this default or selected screw speed is used by the extruder temperature controller to derive a new temperature "individual reset value" for each extruder barrel zone.

The invention further includes a means for generating a control output driver signal to a heat exchange means. The means for generating a control output driver signal includes a means for transmitting a control output driver signal to each heat exchange zone in the extruder barrel of an extruder system. The means for generating the control output driver signal is responsive to the stored temperature reset value output signal that corresponds to the default screw speed. The means for generating a control output driver signal includes a means for varying the control output driver signal in response to a revised reset value for each heat exchange zone. The control output driver signal controls or operates the heat exchange means for each heat exchange zone. The means for generating a control output driver signal, typically, is programmed to vary the control output driver signal to the heat exchange means such that the actual temperature of a heat exchange zone, which influences the temperature of the extrusion material, is not altered when the extruder screw changes speed. Numerous other factors, for example, the pressure, the friction of an extrusion material within an extruder barrel, and the type of material being extruded, effect the actual temperature of an extrusion material.

The most desirable embodiments of the invention include extruder systems having the adaptive reset temperature controller of this invention utilized in conjunction with at least one other extruder temperature controller that continuously monitors, compares, and adjusts operating extruder system temperatures. Other extruder temperature controllers that continuously monitor, compare, and adjust operating extruder system temperatures function well when the extruder screw is operated at a constant speed. The combination of the present invention with such an extruder temperature controller provides an extruder system with an additional ability to store and retrieve reset values upon speed changes. The increased operational flexibility of an extruder temperature controller that includes the adaptive reset temperature controller of the invention provides economic advantages by reducing the amount of wasted extrusion material that is created when the screw speed is changed during operation. These economic advantages of such a "dual extruder temperature controller" are especially realized with processes that have continual or unanticipated screw speed changes.

The dual extruder temperature controller of the preferred embodiment of the invention maintains stable and accurate temperature control of extruder barrel zones even during continual or unanticipated screw speed transitions. The preferred embodiment of the invention is an improvement to the extrusion system described in U.S. Pat. No. 31,903 to Faillace, herein incorporated by reference. The Faillace disclosure is incorporated for its description of terms that are standard in the art, the description of extruder systems in general, and the description of an extruder temperature controller that continuously monitors, compares, and adjusts the temperatures of an operating extruder system.

An extruder system, that incorporates an extruder temperature controller according to the invention, has a barrel with an axis and at least one heat exchange zone along the axis. The extruder system has a screw within the barrel and a shell surrounding the barrel. A "heat exchange zone" is a portion of the barrel and a corresponding portion of the shell wherein the temperature can be controlled by a heat exchange means. A heat exchange means is provided for each heat exchange zone. The heat exchange means includes heat exchange elements for exchanging heat in each heat exchange zone. The heat exchange elements have a heat exchange element power means.

The extruder system, according to this invention, has a means for determining an actual screw speed. The means for determining the actual screw speed includes a means for sensing the actual screw speed and a means for producing an actual screw speed input signal for the extruder temperature controller. The extruder system has a temperature reset value signal input means for inputting a temperature reset value signal representative of a desired barrel temperature reset value for each member of a plurality of selected, stored screw speeds. The extruder system has a storage means for independently storing each temperature reset value signal. The extruder system has a means for comparing and selecting that compares the actual screw speed to each of the plurality of stored screw speeds and selects a default screw speed from the plurality of stored screw speeds. The default screw speed has a smaller deviation from the actual screw speed than any other member of the compared, stored screw speeds. The selection of the default screw speed determines the temperature reset value signal that is retrieved by the extruder temperature controller of the invention.

The extruder system also has the means for generating the control output driver signal. The means for generating, as described above, is responsive to the stored temperature reset value signal. The means for generating is, desirably, an "output driver" and is responsive to the stored temperature reset value for the default screw speed. The means for generating includes a means for varying the control output driver signal for each heat exchange zone. The means for varying is actuated when the means for comparing and selecting is actuated due to the existence of a significant deviation between actual screw speed and the selected screw speed. The temperature reset value control setpoint controls the heat exchange power means for each heat exchange zone to provide a temperature in each heat exchange zone.

FIG. 1 illustrates a barrel portion of an extruder system 1 having two adaptive reset temperature controllers 22 according to the invention. The extruder system 1 contains a driving or extruder screw 10 housed within an extruder barrel 12. The rotation of the extruder screw 10 forces molten extrusion material, such as plastic, along the axis of the extruder barrel 12. The extruder barrel 12 includes at least one and, desirably, a plurality of heat exchange zones 14. Each heat exchange zone 14 contains a heat exchange element 15 for heating or cooling the extruder barrel 12. The heat exchange element 15 comprises, for example, resistive heating elements 18 to increase the temperature of a heat exchange zone 14 and tubes 20 to circulate water or another coolant around the heat exchange zone 14 in order to decrease the temperature of the heat exchange zone 14. A digital encoder 16 determines the actual screw speed and provides a screw speed input signal 17 to the adaptive reset temperature controller 22. Panels having keyboards for the input of control signals and a display (not shown) are known in the art and can be provided as described in the Faillace Reissue Patent that is cited above.

Each adaptive reset temperature controller 22 is, desirably, dedicated to one heat exchange element 15. The heat exchange element 15 of a single heat exchange zone 14 is regulated by the adaptive reset temperature controller 22 in response to a pair of temperature measurements taken in the heat exchange zone 14. A deep temperature sensor or "A" thermocouple 24 is placed near the inner surface 28 of the extruder barrel 12 and, desirably, contacts a liner 3 to provide a deep temperature signal $T_d$ representative of the temperature deep within the cylinder of the extruder barrel 12. A shallow temperature sensor or "B" thermocouple 26 is placed in the heat exchange element 15 to provide a shallow temperature signal $T_s$ representative of the temperature at the heat exchange element 15 which is the source of thermal energy or of cooling.

Figure 2:
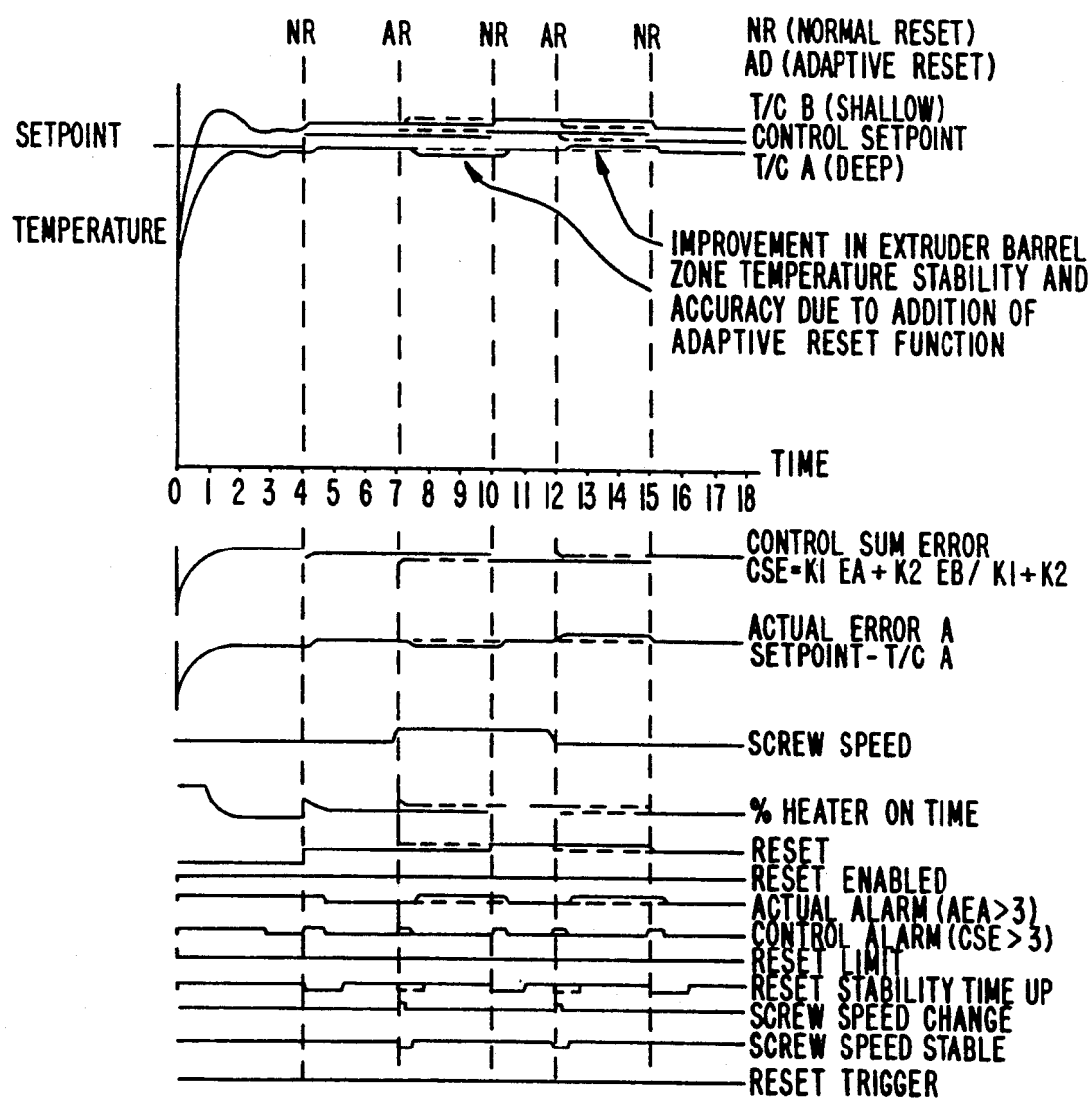
FIG. 2 is an event diagram of the operation of the preferred embodiment of the extruder temperature controller of the invention under heat load conditions.

FIG. 2 provides a graphic relationship between various parameters that exist during the operation of the extruder system 1 of the invention. This "event" diagram describes the function of a dual sensor temperature controller under heat load conditions. The dual sensor temperature controller has the "adaptive reset function" of this invention. The operation of the extruder system 1, represented by FIG. 2, is for a condition wherein the heat exchange zone 14 is in a heating load condition or adding heat to an extrusion material. The extruder system 1 can also be used in a cooling load condition or to cool an extrusion material passing through the extruder barrel 12.

FIG. 2 presents a graph wherein a single x-axis represents time beginning at time $t_0$. The three curves above the x-axis or "time line" represent the temperature of the shallow or "B" thermocouple, the control setpoint value, and the temperature of the deep or "A" thermocouple. The twelve curves below the x-axis or time line represent simultaneous functions for other y-axes values. These other y-axes values are: (1) the control sum error "E"; (2) error "A" or the difference between the setpoint temperature and the temperature of the deep or "A" thermocouple; (3) actual screw speed "$S_d$"; (4) percent heater on time; (5) reset; (6) reset enabled; (7) actual alarm wherein the actual error is greater than 3° Fahrenheit (1.6° Celsius) (Fahrenheit and Celsius are hereinafter symbolized as "°F." or "°C.", respectively); (8) control alarm wherein $K_1A+K_2B/K_1+K_2>3°$ F. (1.6° C.); (9) reset limit; (10) reset stability time up; (11) screw speed change; (12) screw speed stable; and (13) reset trigger event.

When the extruder system 1 is first activated or at "power on" at time $t_0$, a temperature setpoint controller sets the control setpoint $T_{cp}$ to a value that is equal to the desired temperature of the heat exchange zone setpoint that is selected by the operator. An average error controller asserts heat exchange control signals "H" and "C" as necessary to heat or cool a heat exchange zone. Heat exchange control signal "H" activates the heat exchange element 15 to either increase or decrease the temperature in the heat exchange zone 14. FIG. 2 between time $t_0$ and time $t_4$ illustrates a condition wherein (1) the resistive heating elements 18 are supplying heat and (2) deep temperature signal $T_d$ and shallow temperature signal $T_s$ rapidly rise.

The adaptive reset temperature controller 22 continues to assert heat exchange control signal "H" until time $t_2$ when the control sum error "E" signal has approximately reached zero. The heat exchange control signal "H" is terminated at time $t_2$ and the shallow temperature signal $T_s$ ceases to rise and begins to fall as the resistive heating elements 18 cool. Residual heat stored in the heat exchange element 15 continues to heat the extruder barrel 12. The deep temperature signal $T_d$ continues to rise until time $t_3$ when the deep and shallow temperatures stabilize.

FIG. 2 illustrates the extruder system 1 as being stabilized at time $t_4$ and as having an actual error "A" signal of greater than 3° F. (1.6° C.). An actual error sensitivity can be selected by the manufacturer. An actual error sensitivity is, typically, between 3° F. and 5° F. (about 1° C. and about 3° C.). FIG. 2 illustrates the operation of an adaptive reset temperature controller 22 of the preferred embodiment of the invention wherein either a "normal reset" function can occur or an "adaptive reset" can occur due to a screw speed change. The curves of FIG. 2 represented by a solid line occur with a normal reset temperature controller. Curves represented by a broken line occur with an adaptive reset temperature controller.

A setpoint $T_D$ can be entered by the operator. The setpoint $T_D$ is representative of the desired temperature for the extruder barrel zone. The first normal reset resolved by the adaptive reset temperature controller 22 occurs in FIG. 2 at time $t_4$. The normal reset temperature controller resolves a new value for control setpoint $T_{cp}$ which increases the "percent heater on time" of the heat exchange element 15.

The curve for the deep or "A" thermocouple decreases between time $t_7$ and time $t_{10}$ due to a screw speed change. An increase in screw speed causes a heat load or a requirement to increase the heat applied by the heat exchange element 15. The temperature of the deep or "A" thermocouple normally decreases in this condition until a normal reset occurs at time $t_{10}$.

The curve for reset illustrates both normal and adaptive resets for controlling an extruder system. A first active "normal" reset is at time $t_4$. The solid line for the reset value illustrates two other normal resets with the first occurrence at time $t_{10}$ and the second occurrence at time $t_{15}$. The broken lines for the reset function represent an occurrence of "adaptive reset" as provided by the adaptive reset controller (described below) of this invention. The curve illustrates two adaptive resets with the first occurrence at time $t_7$ and the second occurrence at time $t_{12}$.

The adaptive reset controller of the invention anticipates the reset value at time $t_7$ as represented by the broken line for reset. This anticipation of the reset value changes the control setpoint at time $t_7$ as represented by the broken line for this value. The changes in control setpoint actuate the "percent heater on time" at time $t_7$ as represented by the broken line for this reset value. The actuation of the percent heater on time maintains a constant temperature in the heat exchange zone 14 as represented by the broken line for the deep or "A" thermocouple. The maintenance of the temperature effectively eliminates a variation in actual error "A". Actual error "A" is the setpoint value less the deep temperature $T_d$ value.

Adaptive reset provides the desirable and unexpected results of anticipating a requirement to alter the control setpoint and, thereby, effectively eliminates a fluctuation in the temperature at the deep or "A" thermocouple. The adaptive reset controller anticipates and changes the energy to the heat exchange means of an extruder system. This change is performed in order to offset a change in the thermodynamic load due to a stable change in screw speed of that extruder system.

The heater, in an extruder system for processing plastic material, is typically operating with at least some percent heater on time as long as the extruder system is in operation or under a load. The maintenance of a constant temperature within an extruder system under a load is indicative that the extruder system cannot obtain a theoretical "infinite gain" or average error of zero. For this reason, an extruder system operating, for example, at 300° F. (about 150° C.) has an offset temperature that provides at least some percent heater on time to maintain the 300° F. (about 150° C.) temperature. A theoretically perfect extruder system has a zero average error and at 300° F. (about 150° C.) the heater has a zero percent on time when the extruder system is in a stable load condition. The control sum error "E" is, therefore, directly proportional to the load on the extruder system.

The percent heater on time is derived from the control sum error. The control sum error "E" is never zero in actual operation of an extruder system unless that extruder system has no load. The control sum error "E" is derived from two errors "A" and "B." The two errors "A" and "B" are derived from the control setpoint value. Error "A" is the control setpoint $T_{cp}$ value less the deep temperature $T_d$ value. Error "B" is the control setpoint $T_{cp}$ value less the shallow temperature $T_s$ value.

The adaptive reset controller 38 of this invention initiates a new value for the control sum error "E" as represented by the broken lines of the curve beginning at time $t_7$ and time $t_{12}$. This adjustment in control sum error "E" is actuated by a stable change in screw speed. The adjustment in control sum error "E" avoids a change in the curve or value of actual error "A" as represented by the broken line for this value. A lack of change in the value of actual error "A" indicates that the temperature at the deep or "A" thermocouple has not change.

The extruder temperature controller of the invention, desirably, provides protective logic control functions to allow the extruder system to stabilize after a reset. These control functions allow the extruder system sufficient time, such as 3 minutes, to stabilize within a desired temperature variation, such as 3° F. (1.6° C.). These control functions prevent unnecessary and undesirable resets from occurring. An example of such a control function is provided by a reset stability time. Another control function allows the extruder system to "ramp up" to speed without actuating a new reset value until the operating speed is obtained. The extruder system includes other control functions for terminating its operation when an operating condition exists that can damage the extruder system. These functions which include control alarm and flag functions are described in the Faillace Reissue Patent and are represented in FIG. 2.

Figure 3:
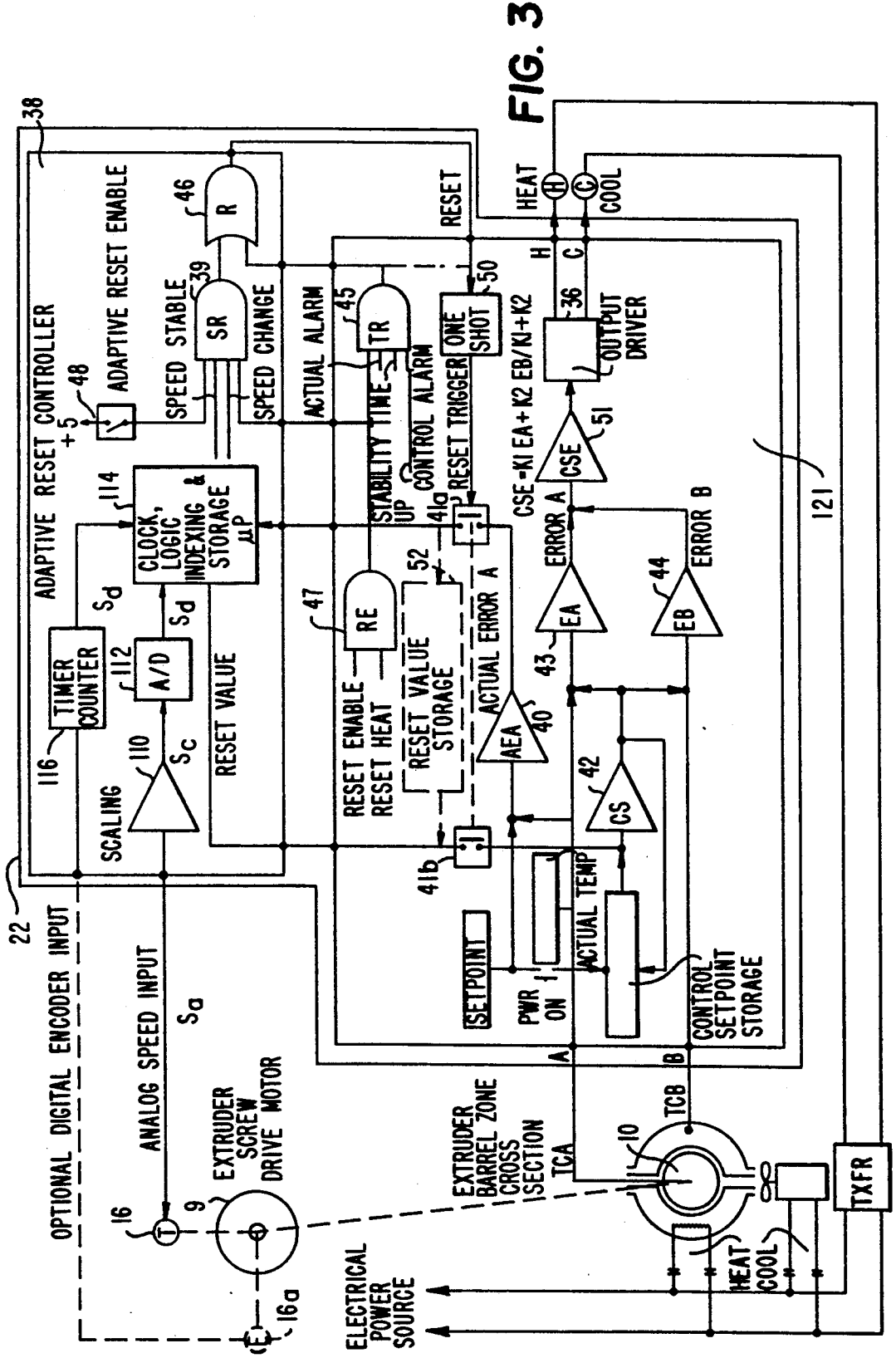
FIG. 3 is a block diagram of an extruder temperature controller that includes an adaptive reset controller according to the invention.

FIG. 3 illustrates the preferred embodiment of the adaptive reset temperature controller 22 according to the invention. The adaptive reset temperature controller 22 of the invention is an improvement over the extruder temperature controller known in the art and described above for the Faillace Reissue Patent. The adaptive reset temperature controller 22 of the invention complements the reset controller of the Faillace Reissue Patent with an adaptive reset controller 38. The adaptive reset controller 38 adjusts the reset value $R_n$ and the control setpoint $T_{cp}$ upon a change in the screw speed. This adjustment for screw speed preempts any significant change in barrel temperature upon the change in the screw speed. The adaptive reset controller 38 can be used with a single sensor extruder temperature controller.

A screw speed sensor or tachometer 16 provides the adaptive reset controller 38 with an analog screw speed signal $S_a$ representative of the present or actual speed of the extruder screw 10. The embodiment of this figure illustrates the extruder screw drive means 9 A scaling buffer 110 receives the analog screw speed signal $S_a$ and generates a corresponding screw speed signal $S_c$. The corresponding screw speed signal $S_c$ is scaled to be within the input range of an analog to digital converter (A/D) 112. The analog to digital converter 112 converts the corresponding screw speed signal $S_c$ to a digital screw speed signal $S_d$ which is representative of the screw speed. An alternative digital speed input means with a timer counter can be used. The resulting screw speed signal is sent to a clock, logic, indexing, and reset storage means 114.

FIG. 3 illustrates an optional speed sensor or digital encoder 16a. The speed input from the digital encoder 16a is processed by a timer counter 116. The resulting digital screw speed signal $S_d$ is sent to the clock, logic, indexing, and reset storage means 114.

The adaptive reset controller 38 selects a reset value for any given operating screw speed. The reset value $R_n$, once it is resolved, is stored in the clock, logic, indexing, and reset storage means 114 at an address determined by digital screw speed signal $S_d$. The clock, logic, indexing, and reset storage means 114 provides logic control signals including a speed stable signal and speed change signal, to a first AND gate 39. A switch 48 allows a reset value to be stored and retrieved. The switch 48 is operator selectable and provides an adaptive reset enable signal to the first AND gate 39. The first AND gate 39 signal is sent to an OR gate 46. The OR gate 46 provides a signal to the reset switch 41a and b. The clock, indexing, and reset storage means and the other subcomponents that are necessary to construct the preferred embodiment of the invention, are provided by commercially available electronic components. The level of skill within the electronic component programming art is sufficient to program a clock, logic, indexing, and reset storage means to provide both (i) a means for indexing and storing a plurality of screw speeds and (ii) a means for comparing, timing, and selecting, via electronic or other logic circuitry, as required by this invention. A suitable clock, logic, indexing, and reset storage means is provided by a properly programmed, commercially available microprocessor. The logic circuit is required for determining the existence or nonexistence of the various comparing and timing parameters such as the satisfaction of the "speed stable" condition.

The adaptive reset temperature controller 22 in the preferred embodiment of the invention has a dual sensor temperature controller 121 such as the extruder temperature controller of the Faillace Reissue Patent. The dual sensor temperature controller 121 monitors logic control signals including a reset enable signal, a reset limit off signal, an actual alarm signal, a stability time up signal, and a control alarm "not" signal. The reset enable signal and the reset limit "not" signal are provided to a second AND gate 47. The second AND gate 47 provides a signal to the first AND gate 39 and to a third AND gate 45. The actual alarm signal, the stability time up signal, and the control alarm off signal are provided to the third AND gate 45. The third AND gate 45 signal is also sent to the OR gate 46. The OR gate 46 provides a single event trigger signal via a "one shot" multivibrator signalling device 50 to reset switch 41a and b. The reset switch 41a and b inputs the actual error "A" signal to the clock, logic, indexing, and reset storage means 114 and has a reset value storage means 52 as shown. The dual sensor temperature controller 121, when it is stabilized, provides the reset value $R_n$. Actual error "A" is provided to the adaptive reset controller 38 when the reset switch 41a and b receives a reset trigger.

The reset trigger is produced in one of two conditions. The first condition is "adaptive reset" and occurs when (1) the screw speed is stable, (2) there is a speed change, (3) the device has not reached a reset limit, (4) reset is enabled, and (5) adaptive reset is enabled. The second condition is "normal reset" and occurs when (1) reset is enabled, (2) the device has not reached a reset limit, (3) there is an actual alarm, (4) the device has not reached a temperature limit, (5) stability time is up, and (6) there is no control alarm.

The dual sensor temperature controller 121 of the preferred embodiment of the invention has a first comparator 40, a second comparator 42, a third comparator 43, a fourth comparator 44, and a fifth comparator 51. The first comparator 40 algebraically adds the setpoint value and deep temperature $T_d$ value to derive the actual error "A" which is provided to the reset switch 41a. When the reset value is asserted by the clock, logic, indexing, and reset storage means 114, a second comparator or control setpoint controller 42 adjusts the control setpoint $T_{cp}$ at the time of "reset trigger". At "power on" control setpoint is set to equal setpoint. The control setpoint controller 42 asserts the control setpoint $T_{cp}$ and provides the signal to the third comparator 43 and the fourth comparator 44. The dual sensor temperature controller 121 performs an algebraic addition by the third comparator 43 for computing an error "A" signal. The third comparator 43 exerts error "A" signal to the fifth comparator 51. The fourth comparator 44 compares the shallow temperature $T_s$ with the control setpoint $T_{cp}$ and derives error "B" signal. Error "B" is also provided to the fifth comparator 51.

The adaptive reset controller 38 provides the control setpoint controller 42 with the reset value $R_v$ indicating the extent to which the control setpoint is to be adjusted. The magnitude of reset value $R_v$ is scaled by the control setpoint controller 42 with an arithmetic module a scaled reset value $R_n$ according to the following equation (1).

$$R_n = r_g \times R_v \quad (1)$$

wherein $r_g$ is a constant reset gain. Typically, the reset gain $r_g$ is set at a value of "1". The new or scale reset value $R_n$ is provided to the control setpoint controller 42. The control setpoint controller 42 then performs an algebraic add of the scaled reset value $R_n$ to the control setpoint $T_{cp}$ to update the control setpoint $T'_{cp}$ at the time of reset trigger according to the following equation (2).

$$T_{cp} = R_n + T_{cp} \quad (2)$$

The dual sensor temperature controller 121 remains stable with an actual error of less than 3° F. (1.6° C.) once the adaptive reset temperature controller 22 has resolved a scaled reset value $R_n$. However, a significant change in the thermal load to the extrusion system causes a change in the heat exchange zone deep temperature $T_d$. The dual sensor temperature controller 121 becomes unstable as it seeks to correct the changes of the heat exchange zone deep temperature $T_d$. The adaptive reset temperature controller 22 includes a dual sensor temperature controller 121 for generating control output driver "H" and "C" signals for heating and for cooling to selectively activate the heat exchange element 15. The third and fourth comparators 43 and 44 generate, respectively, error signals "A" and "B" representing the difference between the control setpoint $T_{cp}$ and the temperature signals $T_d$ and $T_s$, respectively. An arithmetic module in the fourth comparator 51 computes a control sum error E, according to the following equation (3).

$$E = \frac{K_1 A + K_2 B}{K_1 + K_2} \quad (3)$$

where $K_1$ and $K_2$ are constants chosen to provide the appropriate weight to each error signal "A" and "B". In response to the control sum error "E", a heat exchange driver or controller 36 adjusts control output driver signals "H" and "C" to selectively activate either the resistive heating elements 18 or the fluid cooling system (not shown) which provides coolant flow through the tubes 20 of the heat exchange element 15 until the control sum error "E" is minimized.

The logic path for the adaptive reset temperature controller 22 has the clock, logic, indexing, and reset storage means 114 monitoring the digital speed signal $S_d$ to determine when a change in screw speed occurs. When digital speed signal $S_d$ changes, the clock, logic, indexing, and reset storage means 114 selects the stored reset value and signals the dual sensor temperature controller 121. The dual sensor temperature controller 121 then recalculates the control setpoint $T_{cp}$ using equation 2 above.

The AND gate 39 determines when the dual sensor temperature controller 121 has stabilized at the new reset value. Once the dual sensor temperature controller 121 has stabilized, the AND gate 39 receives the reset criteria signals defined above. The reset value $R_v$ is stored in the table of the clock, logic, indexing, and reset storage means 114 at an entry corresponding to the current operating screw speed indicated by the digital speed signal $S_d$.

The invented extruder temperature controller of FIG. 3 applies deep and shallow temperature controls with temperature resets to continual thermal load change processes. The invention provides a means of anticipating thermal load changes due to screw speed changes. The invention applies a temperature reset value for each heat exchange zone 14 based on specific extruder operation speeds or an "adaptive reset" in advance of actually sensing the thermal load change. Adaptive reset resolves or "learns" a reset value for each heat exchange zone 14 at all of the normal operating screw speeds. As the screw speed of the extruder is altered, adaptive reset applies or "recalls" the last temperature reset value which has been learned for each heat exchange zone 14 by a previous reset calculation for that heat exchange zone at that given screw speed. This function is provided by means for comparing and selecting, during operation of an extruder system that (i) corresponds a stabilized operating temperature reset value to each of the operating screw speeds and (ii) enters the actual screw speed with the corresponding temperature reset value into the means for storing.

The extruder temperature controller of the invention senses the screw speed via a standard analog input and applies the screw speed as an index or pointer to a table of learned reset values. These stored reset values can be recalled for each heat exchange zone after the screw speed is altered and stabilized to a new screw speed. A table of 100 addresses, in the preferred embodiment, which represents the reset value for 1 percent to 100 percent of the available screw speed is used for each heat exchange zone. The learned reset value is resolved as it is in the extruder temperature controller of the Faillace Reissue Patent. However, the learned reset value is stored in a nonvolatile reset value storage table, such as an EEPROM memory storage device, at the location specific to the screw speed at the time the reset value is calculated.

When the new screw speed of the extruder system is altered and stabilized and the temperature reset criteria is met, a new temperature reset value is calculated for the new screw speed and stored in the reset value table at its respective address representing that screw speed. This adaptive reset sequence repeats for each new operating speed as it is encountered with a resolution of 1 percent of full screw speed.

The operation of an extruder system, according to the invention, for the first time at a new operating screw speed has no actual reset value resolved for that initial screw speed. An approximate reset value is calculated by the invention for that screw speed by a straight line approximation between the closest adjacent screw speed reset values which have been resolved. This approximate reset value is stored in the reset value table for the new operating screw speed. However, if the new screw speed is maintained long enough for a new reset value to be calculated based on the normal reset criteria, the approximate reset value is replaced with the actual reset value for the new screw speed.

The invented extruder temperature controller provides several advantages to an extruder system. The adjustment of the reset value, in response to a change in the screw speed, enables the invention to preempt an adverse change in the extruder barrel temperature and the temperature of the heat exchange zone. The storing of a collection of previously calculated reset values for various screw speeds enables the invented extruder temperature controller to quickly determine the appropriate reset value by retrieving from memory the reset values corresponding to the current or actual screw speed. The previously calculated reset values enable an extruder system to avoid significant changes in temperature of the heat exchange zone deep temperature fluctuations which often accompany a search for a reset value to provide the desired barrel temperature.

The desirable features of the invention enable the invention to be used with extrusion processes that requires the running of several products. These extrusion processes, typically, occur with extruder systems used in a job shop or a product development laboratory. The invention permits heat exchange zone reset value tables to be resolved or calculated for each profile. Upon selection of the profile number, the corresponding reset value tables are also selected.

The adaptive reset capability of the invention allows for deep and shallow temperature control with temperature reset to be applied to a plastic extrusion process where the screw speed of the extruder can change on a continual or unanticipated basis. The invention in such a process maintains the barrel temperature control, typically, within 1° F. (about 0.5° C.) of temperature stability at all operating screw speeds. The invention, thereby, greatly improves barrel temperature control stability and response even during transition in screw speed. The adaptive reset capability of the invention, therefore, improves the quality and consistency of the plastic melt output of an extruder system during continual or unanticipated changes in operating screw speed. This capability greatly reduces the time to stabilize the heat exchange zone temperature control after a change in screw speed has occurred. This capability significantly improves product quality during start-up and shutdown of an extrusion process line and reduces scrap, particularly in blow molding and wire and cable extrusion processes wherein continual or unanticipated screw speed changes occur.

I claim:

1. An extruder temperature controller comprising:
   means for sensing an actual screw speed of an extruder screw in an extruder barrel, said extruder barrel having at least one heat exchange means in at least one heat exchange zone;
   means for sensing an actual temperature in said at least one heat exchange zone of said extruder barrel;
   means for indexing and storing a plurality of screw speeds, and a plurality of corresponding temperature reset values;
   means for comparing and selecting, said means for comparing and selecting (i) compares said actual screw speed with each of said stored screw speeds and (ii) selects one of said stored screw speeds, said selected screw speed being a member of said plurality of stored screw speeds having a value most arithmetically equivalent to said actual screw speed, said means for comparing and selecting retrieves said temperature reset value corresponding to said selected, stored screw speed; and
   means for generating a control output driver signal to said heat exchange means when said temperature reset value deviates from said actual temperature by an amount greater than a preset threshold amount, said control output driver signal being responsive to said retrieved temperature reset value from said means for comparing and selecting.

2. The extruder temperature controller of claim 1 wherein said means for comparing and selecting during operation of an extruder system (i) corresponds a temperature reset value to each said actual screw speed and (ii) enters said actual screw speed with said corresponding temperature reset value into said means for indexing and storing.

3. The extruder temperature controller of claim 1 further comprising:
   a temperature controller, said temperature controller includes:
   (a) a first comparator, said first comparator compares a setpoint signal with an extruder barrel deep temperature signal, said first comparator provides an actual error signal to said means for comparing and selecting;

(b) a second comparator, said second comparator is a control setpoint controller for performing algebraic addition of a stored control setpoint signal with said temperature reset value, said second comparator provides a control setpoint signal;
(c) a third comparator, said third comparator compares an extruder barrel deep temperature signal with said control setpoint signal, said third comparator provides a first error signal;
(d) a fourth comparator, said fourth comparator compares an extruder barrel shallow temperature signal with said control setpoint signal, said fourth comparator provides a second error signal; and
(e) a fifth comparator, said fifth comparator compares said first error signal and said second error signal and provides a control sum error signal to said means for generating said control output driver signal to said heat exchange means.

4. The extruder temperature controller of claim 1 wherein said means for comparing and selecting is responsive to protective logic control signals.

5. The extruder temperature controller of claim 4 wherein said protective logic control signals include: (1) a reset enable signal; (2) a speed stable signal; (3) a speed change signal; (4) a reset limit off signal; (5) an actual alarm signal; (6) a stability time up signal; and (7) a control alarm off signal.

6. An extruder temperature controller comprising:
a clock, logic, indexing, and reset storage means, said clock, indexing, and reset storage means comprises:
means for sensing an actual temperature in at least one heat exchange zone of an extruder barrel;
(a) means for indexing and storing a plurality of screw speeds of an extruder screw, and a plurality of corresponding temperature reset values for at least one heat exchange zone in an extruder barrel;
(b) means for comparing and selecting, said means for comparing and selecting (i) compares said actual screw speed with each of said stored screw speeds and (ii) selects one of said stored screw speeds, said selected screw speed being a member of said plurality of stored screw speeds having a value most arithmetically equivalent to said actual screw speed, said means for comparing and selecting retrieves and provides said temperature reset value for each said heat exchange zone corresponding to said selected, stored screw speed;
means for sensing an actual screw speed of said extruder screw in said extruder barrel, said means for sensing an actual screw speed provides a screw speed signal to said clock, indexing, and reset storage means;
means for generating a control output driver signal to a heat exchange means when said actual screw speed deviates from said selected screw speed by an amount greater than a preset threshold amount; and
a temperature controller, said temperature controller comprises:
(a) a first comparator, said first comparator compares a setpoint signal with an extruder barrel deep temperature signal, said first comparator provides an actual error signal to said means for comparing and selecting;
(b) a second comparator, said second comparator is a control setpoint controller for performing algebraic addition of a stored control setpoint signal with said temperature reset value, said second comparator provides a control setpoint signal;
(c) a third comparators, said third comparator compares an extruder barrel deep temperature signal with said control setpoint signal, said third comparator provides a first error signal;
(d) a fourth comparator, said fourth comparator compares an extruder barrel shallow temperature signal with said control setpoint signal, said fourth comparator provides a second error signal; and
(e) a fifth comparator, said fifth comparator compares said first error signal and said second error signal and provides a control sum error signal to said means for generating said control output driver signal to said heat exchange means.

7. The extruder temperature controller of claim 6 wherein said means for comparing and selecting during operation of an extruder system (i) corresponds a temperature reset value to each said actual screw speed and (ii) enters said actual screw speed with said corresponding temperature reset value into said means for indexing and storing.

8. The extruder temperature controller of claim 6 wherein said reset switch is responsive to protective logic control signals.

9. The extruder temperature controller of claim 8 wherein said protective logic control signal include: (1) a reset enable signal; (2) a speed stable signal; (3) a speed change signal; (4) a reset limit off signal; (5) an actual alarm signal; (6) a stability time up signal; and a control alarm off signal.

10. The extruder temperature controller of claim 6 wherein said clock, logic, indexing, and reset storage means comprises a plurality of profile tables, each of said profile tables contains reset values for selected extruder operating conditions.

11. A method for controlling extruder temperature comprising:
sensing an actual screw speed for an extruder screw in an extruder barrel, said extruder barrel having at least one heat exchange means;
indexing and storing a plurality of screw speeds, and a plurality of corresponding temperature reset values;
comparing said actual screw speed with each of said stored screw speeds;
selecting one of said stored screw speeds, said selected screw speed being a member of said plurality of stored screw speeds having a value most arithmetically equivalent to said actual screw speed, said step of selecting retrieves said temperature reset value corresponding to said selected, stored screw speed; and
generating a control output driver signal to said heat exchange means, said control output driver signal being responsive to said retrieved temperature reset value.

12. The method for controlling extruder temperature of claim 11 further comprising:
corresponding a temperature reset value to each said actual screw speed; and
entering said actual screw speed with said corresponding temperature reset value into a means for storing.

13. The method for controlling extruder temperature of claim 12 wherein said step of selecting one of said stored screw speeds to retrieve said corresponding temperature reset value is responsive to protective logic control signals.

14. The method for controlling extruder temperature of claim 13 wherein said protective logic control signals include a reset enable signal, a speed stable signal, a speed change signal, a reset limit off signal, an actual alarm signal, a stability time up signal, and a control alarm signal.

15. An extruder temperature controller comprising:
temperature sensing means for determining a temperature in at least one heat exchange zone of an extruder;
a temperature signal input means for receiving at least one deep extruder barrel temperature signal and at least one shallow extruder barrel temperature signal;
a setpoint signal input means for inputting a desired extruder barrel temperature signal;
a temperature controller means, said temperature controller means compares said deep extruder barrel temperature signal with said desired extruder barrel temperature signal and derives a temperature error signal therefrom;
a clock, logic, indexing, and reset storage means for
  (i) indexing and storing a plurality of screw speeds, and a plurality of corresponding temperature reset values,
  (ii) comparing said actual screw speed with each of said stored screw speeds, and
  (iii) selecting one of said stored screw speeds, said selected screw speed being a member of a said plurality of stored screw speeds having a value most arithmetically equivalent to said actual screw speed, said clock, logic, indexing, and reset storage means retrieves said temperature reset value corresponding to said selected, stored screw speed and is responsive to a control sum error signal from said temperature controller means; and
means for generating a control output driver signal to a heat exchange means, said control output driver signal is responsive to said retrieved temperature reset value whereby said temperature controller means provides a new revised control sum error signal to derive a revised control output driver signal to said heat exchange means for an extruder load condition resulting from a stable screw speed change.

16. The extruder temperature controller of claim 15 wherein said clock, logic, indexing, and reset storage means comprises a plurality of profile tables, each of said profile tables contains reset values for selected extruder operating conditions.

17. The extruder temperature controller of claim 1 wherein said extruder barrel comprises a plurality of zones and heat exchange means for each zone;
said means for sensing an actual temperature being capable of sensing a temperature in each of said extruder barrel zones;
said means for indexing and storing being capable of storing a plurality of corresponding temperature reset values for each zone; and
said means for generating a control output driver signal being capable of generating a signal to each heat exchange means.

* * * * *

UNITED STATES PATENT AND TRADEMARK OFFICE
CERTIFICATE OF CORRECTION

PATENT NO. : 5,149,193

DATED : September 22, 1992

INVENTOR(S) : FAILLACE, Louie M.

It is certified that error appears in the above-identified patent and that said Letters Patent is hereby corrected as shown below:

Column 1, line 38, "decreases" should read --decrease--.

Column 1, line 44, "material coming," should read --material,--.

Column 1, line 47, "in" should read --is--.

Column 3, line 45, "U.S. Pat. No." should read --U.S. Reissue Patent Number Re.--.

Column 7, line 60, "U.S. Pat. No." should read --U.S. Reissue Patent Number Re.--.

Column 15, lines 61 and 62, "requires" should read --require--;

Column 17, claim 6, lines 28 through 32,

"6. An extruder temperature controller comprising:
a clock, logic, indexing, and reset storage means, said clock, indexing, and reset storage means comprises:
means for sensing an actual temperature in at least one heat exchange zone of an extruder barrel;"

should read:

--6. An extruder temperature controller comprising:
means for sensing an actual temperature in at least one heat exchange zone of an extruder barrel;
a clock, logic, indexing, and reset storage means, said clock, indexing, and reset storage means comprises:--

UNITED STATES PATENT AND TRADEMARK OFFICE
CERTIFICATE OF CORRECTION

PATENT NO. : 5,149,193
DATED : September 22, 1992
INVENTOR(S) : Faillace, Louie M.

It is certified that error appears in the above-indentified patent and that said Letters Patent is hereby corrected as shown below:

Column 18, claim 9, line 30, "and a" should read --and (7) a--.

Signed and Sealed this

Ninth Day of July, 1996

*Attest:*

BRUCE LEHMAN

*Attesting Officer*  *Commissioner of Patents and Trademarks*